(No Model.)
P. SWEENEY.
JOURNAL BEARING.
No. 433,378.                    Patented July 29, 1890.
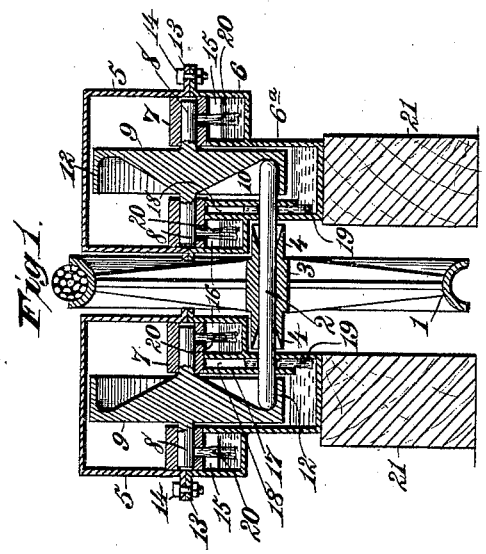
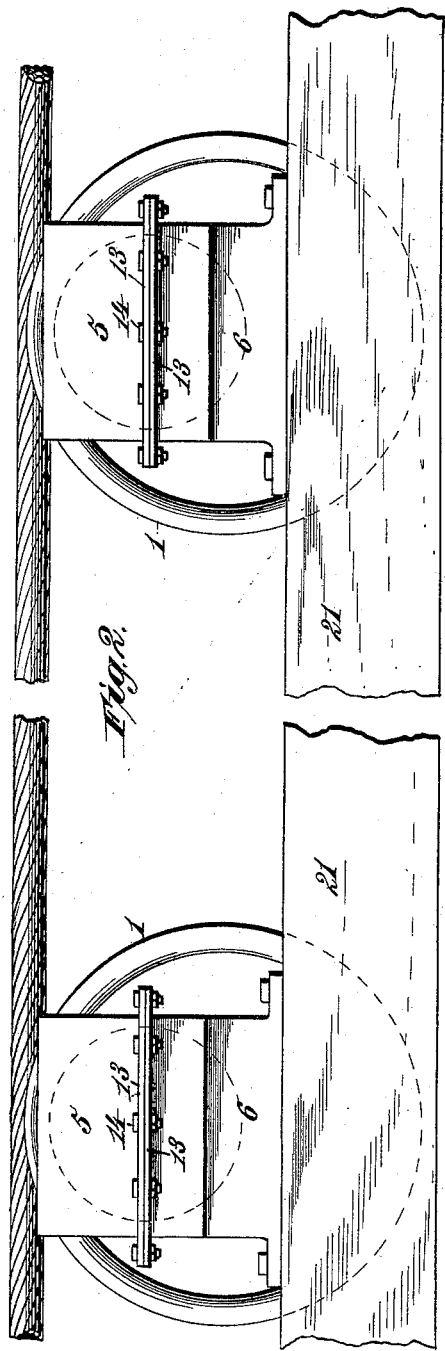
Witnesses,
Robert Everett
J. A. Rutherford
Inventor
Peter Sweeney,
By
James L. Norris
Atty.

UNITED STATES PATENT OFFICE.

PETER SWEENEY, OF NEW YORK, N. Y., ASSIGNOR OF ONE-HALF TO CHARLES H. BOYER, OF SAME PLACE.

JOURNAL-BEARING.

SPECIFICATION forming part of Letters Patent No. 433,378, dated July 29, 1890.

Application filed May 21, 1890. Serial No. 352,598. (No model.)

*To all whom it may concern:*

Be it known that I, PETER SWEENEY, a citizen of the United States, residing at New York, in the county of New York and State of New York, have invented new and useful Improvements in Journal-Bearings for Cable-Carriers of Street-Railways, of which the following is a specification.

My invention relates to certain improvements in the means employed for sustaining the grooved guide-pulleys which support the cable in a cable railway.

It is the purpose of my invention to provide a novel and simple construction and combination of parts whereby the grooved pulley shall have perfectly stable support, shall run with the minimum degree of friction, and almost entirely, or substantially so, without the noise which is now one characteristic feature of a cable railway, this noise being mainly produced by the grinding of the journals of these pulleys in their bearings.

It is one purpose of my invention also to provide bearings for the grooved pulleys supporting the cable, which shall be far more durable and cause much less wear to the journals of the cable-pulleys, as well as to the journal-bearings, than has heretofore been possible.

To these ends my invention consists in the several novel features of construction and new combinations of parts hereinafter fully set forth, and then definitely pointed out in the claims which follow this specification.

To enable others skilled in the art to understand and practice my said invention, I will proceed to describe the same in detail, referring to the accompanying drawings, in which—

Figure 1 is a sectional view in a vertical plane transverse to the cable and through the axis of one of the pulleys. Fig. 2 is a side elevation of a portion of the cable, showing the pulleys and their supports.

In the said drawings, the reference-numeral 1 denotes a grooved pulley or wheel of the kind ordinarily used to support the cable of a street-railway. This pulley is provided with an axle 2, extending upon each side of the hub 3, said axle being rigid with the pulley. Upon the hub 3 at each end thereof is formed a cylindrical prolongation 4, having a countersink at the end. The purpose of this construction will be explained hereinafter.

Upon each side of the pulley is arranged a casing or housing having an upper portion 5 and a lower portion 6, which is contracted in size. In the larger upper portion 5 of this housing are placed two separable bearings 7, which receive the journals 8 of the wheel 9, having an internal annular recess 10, forming a flange 12, which is horizontal. It will be noted that the periphery of the wheel 9 lies partly within the contracted lower portion 6 and partly within the enlarged upper part 5. The journals of the wheel 1 penetrate the walls of the casing or that portion thereof in which the lower part of the revolving journal-bearing wheels have movement, and the ends of said journals rest upon the inner concave faces of the flanges 12, thereby giving a slow and steady movement to said bearing-wheels. These journals are carried through the wall of the lower and narrower part 6 of the casing or housing and lie upon the flanges 12 of the wheel 9, as already stated.

The housing or casing 5 and 6 is formed in two parts, their union being effected by flanges 13, which extend around all four sides, said flanges being very narrow upon the side adjacent to the cable-pulley to enable the latter to be set closely up to the housing. Upon the three remaining sides, however, they are of such width as to permit the introduction of bolts 14, whereby the parts are firmly united. The vertical walls 6ª of the lower chamber 6 are continued upward above the floor of the chamber 5 to or nearly to the bearings of the shaft 8, carrying the journal-wheel 9, thereby forming separate oil-chambers 15 and 16. A parallel wall 17 is also formed on the side adjacent to the cable-pulley and at a little distance from the vertical wall 6ª, said wall 17 being carried downward into the lower chamber, the purpose thereof being to form a space 18, within which a piece of felt or other suitable material 19 may be inserted, having an opening through which the shaft of the pulley passes. This felt not only feeds the oil in the lower chamber to the shaft, but also prevents the escape of oil through the shaft-opening. The countersunk extensions 4 also serve to receive any escape of oil.

In each of the oil-chambers 15 and 16 are arranged wicks 20, which penetrate the bearings supporting the shaft of the journal-wheel 9; but no wick is used in the lower chamber, as the felt 19 answers the same purpose.

The housings sustaining the cable-pulleys are arranged at suitable intervals upon timber or other supports 21, placed within the cable conduit either continuously or at any suitable points.

What I claim is—

1. In a cable railway, the combination, with the timbers or supports in the cable-conduit, of two independent and separated closed housings contracted at their lower portions and supported in fixed positions by the timbers or supports, the two flanged wheels journaled in the larger portions of the housings and extending into the contracted portions thereof, and the grooved sheave or pulley having opposite journals extending into the contracted portions of the housings and supported by the flanges of the housed wheels, substantially as described.

2. In a bearing for the pulleys or sheaves of a street-railway, the combination, with a duplex housing supported on timbers, of a pulley sustaining the cable and having journals projecting on each side thereof, a flanged wheel journaled in bearings in each of said housings to receive the projecting journals, said housings provided with oil-chambers having wicks which communicate with the bearings of the wheel carrying the journals of the pulley, substantially as described.

3. In a bearing for the pulleys or sheaves for a cable for a street-railway, the combination, with a housing on each side of the pulley having a horizontal division into two parts, of journal-wheels each having an internal flange, their journals being supported in separable bearings within the housings of a cable-supporting pulley, the journals of which rest upon the flanges of said wheels, the housing being provided with a contracted lower extension having an interior wall between which and the outer wall a piece of felt or other material is inserted, through which the shaft of the cable-pulley passes, substantially as described.

In testimony whereof I have affixed my signature in presence of two witnesses.

PETER SWEENEY.

Witnesses:
SILAS E. MURDOCH,
ROBERT B. ALLING.